Jan. 6, 1942.    S. W. McCHESNEY, JR    2,269,409
WIRE HOLDER
Filed Jan. 31, 1940    2 Sheets-Sheet 1
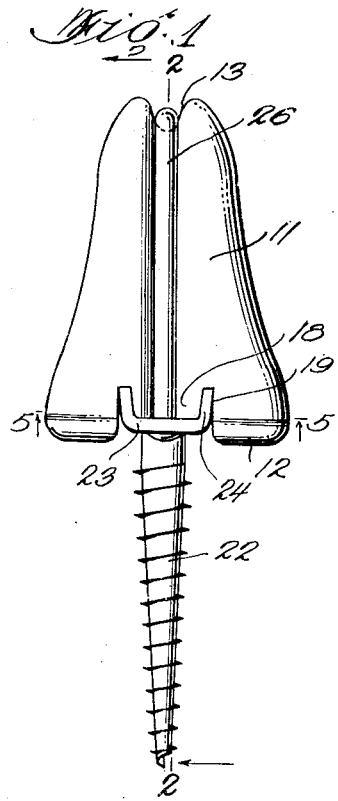
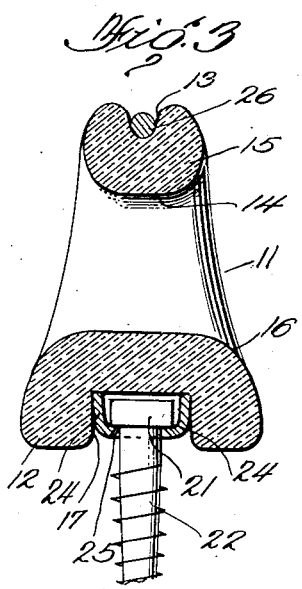
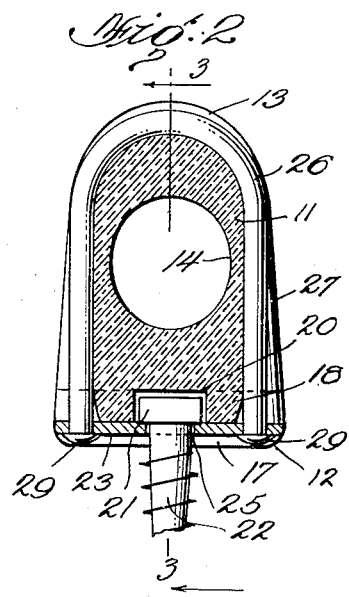
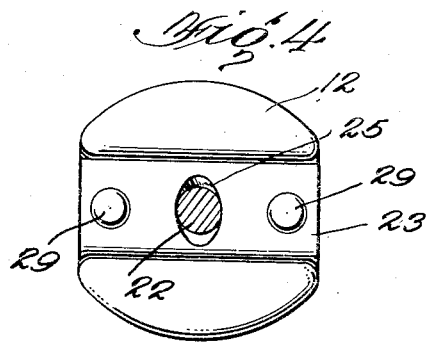
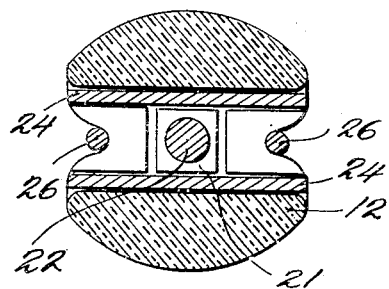
Samuel W. McChesney, Jr
Inventor
By Elmer Stewart
Attorney

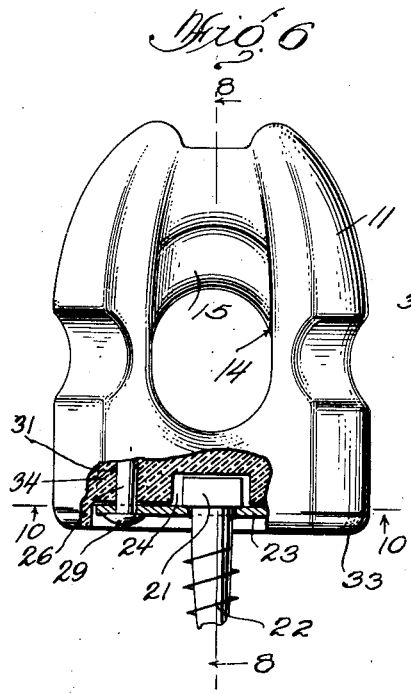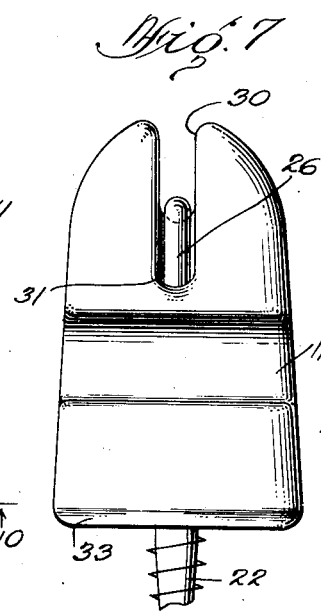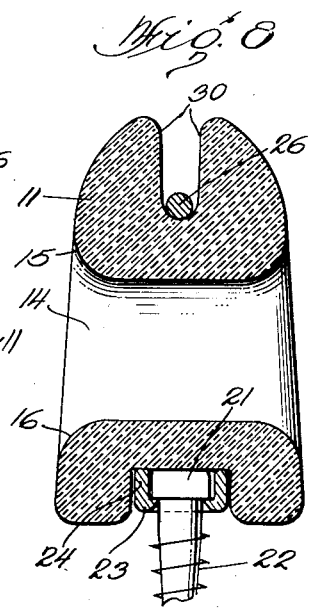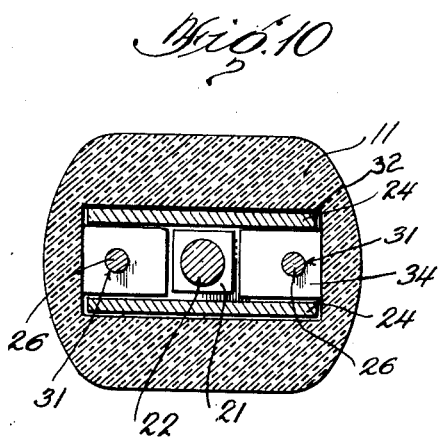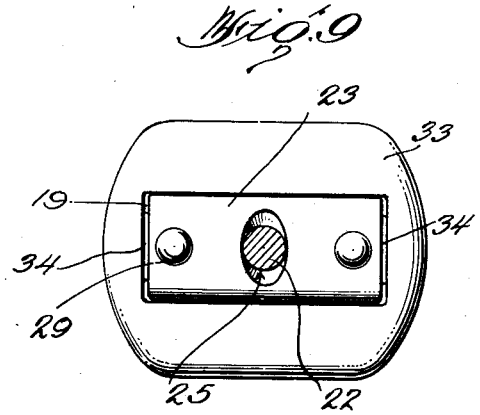

Patented Jan. 6, 1942

2,269,409

UNITED STATES PATENT OFFICE 2,269,409

WIRE HOLDER

Samuel Waldrop McChesney, Jr., Carey, Ohio, assignor to Porcelain Products, Inc., Findlay, Ohio, a corporation of Delaware Application January 31, 1940, Serial No. 316,643

10 Claims. (Cl. 174—154)

The description which follows relates to a wire-holder by which an electric conducting wire, cable or the like may be supported or suspended under tension. Such wire-holders are commonly used to sustain a mid-portion of an electric wire on a pole, tree, building or the like. It is also useful for dead-ending an electric service line. Briefly, it serves to hold the wire either in a straight line or when the branches of the wire extend in varying angular directions.

A satisfactory article of this type must be of rugged simple construction to withstand severe handling in installation and considerable tension from the wires themselves. The electrical insulating character must give reasonable assurance against leakage of current or breakdown. Due to the wide variety of supports and their irregular surfaces it is essential that the wire-holder be able in its final position to conform to the surface of the support at slight variation from the direction in which the fastening means is applied. Finally, it is of considerable importance to protect the metal parts and screw fastening member from weathering or specifically corrosion. Wireholders constructed in accordance with my invention carry out the above objects and possess the advantages indicated. For the purpose of illustration I have shown my preferred embodiment of the invention in the accompanying drawings in which, Fig. 1 is a side elevation of my improved wireholder;

Fig. 2 is a vertical section on the line 2—2 of Fig. 1;

Fig. 3 is a vertical section on the line 3—3 of Fig. 2;

Fig. 4 is a bottom plan view;

Fig. 5 is a transverse section on the line 5—5 of Fig. 1;

Fig. 6 is a front elevation of a modified form;

Fig. 7 is a side elevation of the same;

Fig. 8 is a vertical section on the line 8—8 of Fig. 6;

Fig. 9 is a bottom plan view; and

Fig. 10 is a transverse section on the line 10—10 of Fig. 6.

As typical of my invention I have shown wireholders embodying the improved features. These holders comprise an insulating body member 11. This is customarily made of appropriate porcelain or similar plastic of satisfactory electrical insulating property. It may take a wide variety of shapes. One essential, however, is that the body have a substantially flat base 12. This base is of suitable area capable of distributing the fastening compression and thus reducing the internal stress of the body member 11. The top of the insulator is slotted as shown at 13 to form a stirrup or saddle for a holding means. Extending transversely of the insulating body member and on an axis at right angles to the plane of the slot 13 is a central aperture 14. This aperture holds the conducting wire and permits its approach to the wire holder and its line of departure to assume any convenient angles. For this purpose the edges of the aperture 14 are flared as indicated at 15 and 16 on Fig. 3.

The base of the member 11 has a transverse depression 17 running in a common plane with the slot 13 and thus perpendicular to the direction of the aperture 14.

The depression 17 has a pair of upstanding lands or steps 18. These lands are separated from the sides of the depression and thus provide a pair of parallel spaced channels 19. In the form shown in Figs. 1 to 5 inclusive, these channels 19 extend entirely across the width of the base 12 and thus leave the latter open at diametrical points.

A recess 20 exists centrally between the lands 18 as shown in Figs. 2 and 5.

This recess receives the squared head 21 of a wood screw 22 or analogous fastening. As indicated in Figs. 2, 3 and 5 the recess 20 is sufficiently larger than the head 21 of the screw so that the latter will not bear heavily against the porcelain surfaces.

The head of the screw is held in position by means of a plate 23. This plate has opposite parallel flanges 24, 24. As shown in Fig. 3 the flanges fit closely on opposite sides of the screw head 21 and constrain the latter from relative rotation. Each flange 24 fits loosely within the channels 19 formed between the lands 18 and the remainder of the base 12. The plate 23 rests against the outer surface of the lands 18.

The shank of the screw 22 passes through a central hole 25 in the plate 23. As indicated in Fig. 3 this hole 25 is flared on the sides adjacent the flanges in order to permit the screw to be held loosely and capable of a definite tilt with respect to the plane of the base 12. Thus the base may be brought into close contact with the support entirely around the screw fastening which may not be perpendicular to the surface of the support.

The means for holding the plate 23 tightly against the faces of the lands 18 is a strap, round rod, flexible cable or similar member 26. This strap rests at its mid-portion in the slot 13 across the top of the insulator body. The ends of the strap extend through open grooves 27 on the sides of the insulator 11 laterally of and around the aperture 14 as shown in Fig. 2. The ends of the strap 26 pass through holes 28 in the ends of the plate 23 and terminate in upset or riveted ends 29, 29. It will be noted that the plate 23 and the projecting ends 29, 29 are above the surface of the base 12 so that neither the plate nor the ends 29 come in contact with the support after the wire-holder is mounted.

In accordance with the modification illustrated in Figs. 6 to 10 inclusive, it will be noted that the top of the insulator is slotted at 30 to a deeper extent. This gives added protection against grounding of the conducting wire when it is laid over the top of the wire-holder. Again the side portions of the strap 26 are carried down through openings 31 in the sides of the insulator body. Thus the strap 26 is shielded from exposure for the greater part of the side elevation of the wire-holder.

In this form the depression 32 does not extend through the side walls of the body 11 but on the contrary stops as indicated in Fig. 9 to provide the completely surrounding base 33 across the ends of the depression 32.

At each end of the depression 32 there is a land or step 34 of such a height as to support the plate 23 above the base 33. In this position the side flanges 24 of the plate rest in the channels 19 on opposite sides of the lands 34. The ends of the strap 26 passing through the holes 31 also extend beyond the plate 23 where they are riveted as at 29.

This form of the invention provides for a continuous base completely surrounding the plate 23 and the screw 22. The protection extends upwardly as shown in Fig. 7 beyond the level of the aperture through which the conducting wire passes.

The porcelain insulator body in either of the forms above shown, is readily and economically manufactured. The form permits ready assembly of the plate carrying the screw fastening. By upsetting the ends of the strap 26 the plate and the associated parts are held above the plane of the base. At the same time slight freedom of movement is permitted the fastening screw so that the base of the insulator body may be tilted to give extended contact with the support.

It is the general practice to attach such a wire holder by driving it smartly up against the support so that the wood screw engages. By rotating the device as a whole the force is applied to the transverse plate 23 and from that member to the squared head of the screw. The torsion is applied between the insulator body and the side flanges of the plate 23 over extended surfaces thus distributing the compression on the porcelain. After mounting there is no abnormal tension upon the porcelain, as the strap 26, plate 23 and screw 33 form a complete support and the porcelain serves principally as an insulating member.

While the preferred form of the invention has been illustrated for the purpose of example, the scope of the appended claims permit wide variation in proportion, materials and arrangement without departing from the invention.

What I claim is:

1. A wire-holder having an insulating body member with a flat base and a transverse wire-holding aperture, parallel spaced channels extending across the base, lands intermediate said channels, said member being grooved above and laterally of the transverse passageway, passageways extending from the grooved portion of the member to the base, a plate resting against said lands and having parallel flanges seated in the channels of the base, a strap in said grooved portion and said passageways and having its ends fastened to said plate, and a screw held by said plate for rotation therewith.

2. A wire-holder having an insulating body member with a flat base and a transverse wire-holding aperture, parallel spaced channels extending across the base, lands intermediate said channels, a central recess connecting the channels, said member being grooved above and laterally of the transverse passageway, passageways extending from the grooved portion of the member to the base, a plate resting against said lands and having parallel flanges seated in the channels of the base, a strap in said grooved portion and said passageways and having its ends fastened to said plate, and a screw with its head in said recess and held by said plate for rotation therewith.

3. A wire-holder having an insulating body member with a flat base and a transverse wire-holding aperture, parallel spaced channels extending across the base, lands intermediate said channels, a central recess connecting the channels, said member being grooved above and laterally of the transverse passageway, passageways extending from the grooved portion of the member to the base, a plate resting against said lands and having parallel flanges seated in the channels of the base, a strap in said grooved portion and said passageways and having its ends fastened to said plate and a screw passing through the plate and having its head in the recess and held by the flanges of the plate against independent rotation.

4. A wire-holder having an insulating body member with a flat base and a transverse wire-holding aperture, parallel spaced channels extending across the base, lands extending completely across the base between the channels, a central recess connecting the channels, a plate having parallel flanges and a central hole, means for holding said plate with its flanges in said spaced channels and a screw having its shank loosely passing through the hole in the plate with its head in the central recess between said flanges.

5. A wire-holder having an insulating body member with a flat base, and a transverse wire-holding aperture, a depression having parallel spaced channels extending across the base, lands extending completely across the base between the channels, a plate having a central hole and parallel flanges seated in the said channels, a screw having its shank loosely passing through the hole in the plate and constrained against rotation relatively thereto and means for holding said plate in the depression above the plane of the base.

6. A wire-holder having an insulating body member with a flat base and a transverse wire-holding aperture, a depression in said base, spaced upstanding lands in said depression, extending across the depression to within a short distance from its side walls, a plate having a central hole and parallel flanges resting against the opposite sides of said lands, a screw having its shank loosely passing through the hole in the plate and constrained against rotation relatively thereto and means extending from above the transverse aperture for holding said plate in the depression of the base.

7. A wire-holder having an insulating body member with a flat base and a transverse wire-holding aperture, a depression within the base and completely surrounded thereby, upstanding lands in said depression, a plate having a central hole and parallel flanges resting against the opposite sides of said lands, a screw having its shank loosely passing through the hole in the plate and constrained against rotation relatively thereto and means for holding said plate in the depression.

8. A wire-holder having an insulating body member with a flat base and a transverse wire-holding aperture, a depression within the base and completely surrounded thereby, upstanding lands in said depression, a plate having a central hole and parallel flanges resting against the opposite sides of said lands, a screw having its shank loosely passing through the hole in the plate and constrained against rotation relatively thereto and means for holding said plate in the depression above the plane of the surrounding base.

9. A wire-holder having an insulating body member with a flat base and a transverse wire-holding aperture, a depression within the base and completely surrounded thereby, upstanding lands in said depression, a plate having a central hole and resting against said lands, a screw having its shank loosely passing through the hole in the plate and constrained against rotation relatively thereto and means for holding said plate in the depression in the plane of the surrounding base, said holding means passing through the sides of said body member.

10. A wire-holder having an insulating body member with a flat base and a transverse wire-holding aperture, said body member being slotted across its top in a plane at right angles to the wire-holding aperture, a depression within the base and completely surrounded thereby, upstanding lands in said depression, a plate having a central hole and resting against said lands, a screw having its shank loosely passing through the hole in the plate and constrained against rotation relatively thereto and means for holding said plate in the depression above the plane of the surrounding base, said holding means passing through the sides of said body member and the slotted top thereof.

SAMUEL WALDROP McCHESNEY, Jr.